United States Patent
Hartenstein et al.

[11] 3,857,832
[45] Dec. 31, 1974

[54] PROCESS FOR THE PREPARATION OF CARDIOTONIC GLYCOSIDES

[75] Inventors: Johannes Hermann Hartenstein, Wittental; Gerhard Satzinger, Gundelfingen, both of Germany

[73] Assignee: Warner-Lambert Company, Morris Plains, N.J.

[22] Filed: Mar. 21, 1972

[21] Appl. No.: 236,587

[52] U.S. Cl. .............................. 260/210.5, 424/182
[51] Int. Cl. .......................................... C07c 173/00
[58] Field of Search .............................. 260/210.5 R

[56] References Cited
UNITED STATES PATENTS

| | | | |
|---|---|---|---|
| 3,240,777 | 3/1966 | Sarett et al. | 260/210.5 |
| 3,325,474 | 6/1967 | Sarett et al. | 260/210.5 |
| 3,585,186 | 6/1971 | Conrow et al. | 260/210.5 |
| 3,629,234 | 12/1971 | Eberlein et al. | 260/210.5 |

OTHER PUBLICATIONS
Fieser and Fieser, M. and L., Reagents for Organic Synthesis, Vol. II, 1969, Wiley and Sons Inc., New York, N.Y., p. 363.

*Primary Examiner*—Lewis Gotts
*Assistant Examiner*—Cary B. Owens
*Attorney, Agent, or Firm*—Albert H. Graddis; Frank S. Chow; George M. Yahwak

[57] ABSTRACT

The present application relates to a process for the preparation of glycosides of the general formula I

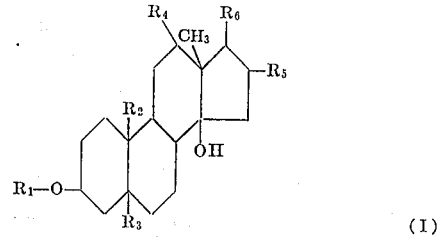

(I)

wherein $R_1$ is a glycoside residue which may be substituted, $R_2$ is an aldehyde or methyl group, $R_3$, $R_4$ and $R_5$ are each a hydrogen atom or a hydroxyl group, $R_6$ is a butenolide or an α-pyrone ring, in which a steroid aglycone of the general formula II

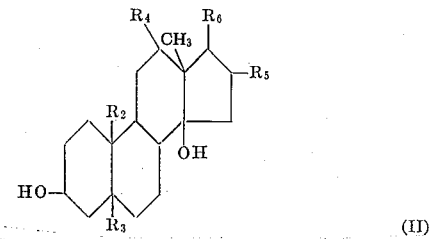

(II)

wherein $R_2$, $R_3$ and $R_6$ have the above meanings, and $R_4$ as well as $R_5$ represents a hydrogen atom, a hydroxyl group or a lower acyloxy group is reacted with an O-acylglycosyl halide in an inert solvent, in the presence of heavy metal salts of the elements of group Ib or IIb of the periodic table dispersed on celite, removing the reaction water formed by means of azeotropic distillation, and saponifying the acylated glycosides thus obtained. Compounds obtained by this process possess cardiotonic properties.

4 Claims, No Drawings

PROCESS FOR THE PREPARATION OF CARDIOTONIC GLYCOSIDES

It has been known from literature on the subject that the glycose moiety may exert an influence, in a therapeutically desirable or undesirable sense, on the biologic activity of the cardiac glycosides residing in the genin portion, in particular with regard to the pharmacodynamic properties thereof. A thorough pharmacological investigation of the influence of the glycose moiety has so far not been feasible — mostly due to the fact that the glycosides of interest could either not be obtained or only obtained in small quantiies. Therefore, many attempts have been made in order to obtain natural or synthetic cardiac glycosides from more readily accessible aglycons, on a larger scale, by partial synthesis.

Numerous variants of the known synthesis of glycosides according to Königs-Knorr were used with varying degrees of succes for partial synthesis of cardenolides and bufadienolides. In only a few exceptional cases the yield has amounted to more than 50%. Probably the difficulties arise from the fact that owing to the labile nature of the C-14-hydroxyl group, the formation of undesirable — since inactive — anhydrogenins leads to decreases in yield (cf. review by W. W. Zorbach et al., Adv. Carbohydrate Chem. 21, 273 (1966).

Thus for example, the reaction according to Königs-Knorr of α-L-acetobromorhamnose with strophanthidin in the modified manner according to Meystre and Miescher with subsequent saponification results in a yield of 44% of strophanthidin-α-L-rhamnopyranoside (convallatoxin; Helv. 33, 1541 (1950)), while in the corresponding reaction of α-D-acetobromoglucose according to Helv. 40, 284 (1957) strophanthidin-β-D-glucopyranoside is obtained in varying amounts (6–35%). The modification according to V. T. Chernobai (Z. obsc.Chim. 34, (1964), 1014) of the process, (addition of calcium oxide) results in no decisive improvement. The $Hg(CN)_2$— process according to Helferich, no doubt, proved to be successful in individual cases (e.g. in the preparation of evomonoside, J.org. Chem. 27(1962), 1766; yield: 44% of crude product), but does not seem to be applicable generally, according to experience to date, (cf. W. W. Zorbach, l.c.). A marked increase in yield is observed, however, if small quantities of basic material, such as calcium carbonate, are added to the reaction mixture, according to German Patent Specification for Public Inspection No. 1933090. Compared to that process the present process according to the invention, however distinguishes itself by considerably shorter reaction times with comparable yields of glycosides. Since no basic additives are used, this process as claimed by us, moreover, excludes the risk of formation of isogenins which might impede isolation of the desired glycosides. Furthermore, the process according to the invention requires a smaller excess (normally twice the molar amount only) of sugar halide, this being especially profitable with the rarer sugars, in particular.

The process according to the invention must be considered surprising, since the reagent silver carbonate on celite according to C.R. 267, 900(1968), used preferably as the condensation agent, represents an outstanding oxidising agent for the oxidation of alcohols, in particular also of steroid alcohols. Oxidation of the 3β-hydroxyl group of the aglycons used has, however, not been observed in the process claimed here.

As aglycons, there can be used for partial synthesis cardenolides and bufadienolides, such as the easily accessible aglycons strophanthidin, digitoxigenin, 12-O-acetyl-digoxigenin, 16-O-acyl-gitoxigenin, gitaloxigenin, oleandrigenin, hellebrigenin etc., in particular.

For the reaction with the aglycon poly-O-acylated chloro-, bromo- or iodo-sugars, such as acetochloroglucose, acetobromoglucose, acetobromorhamnose, acetobromomannose, benzobromorhamnose, benzochlororhamnose, acetobromoxylose, acetobromoallose, p-nitrobenzochlororhamnose, furthermore N-acyl or N-phosphorylamino-1-halogen sugars, are suitable.

As heavy metal salts, there may be used all carbonates, oxides and cyanides of the elements of the group Ib or IIb of the periodic table, such as $Ag_2CO_3$, $Ag_2O$, $HgCO_3$, $CdCO_3$, $HgO$, $Hg(CN)_2$, which are freshly precipitated onto celite. For celite, preference is given to freshly purified kieselgur of the prevailing particle size 20–45μ. Preparation of the silver carbonate/celite reagent, used preferably as the condensation agent, is effected for instance according to C. R. 267 (1968), 900, by suspending purified kieselgur in an aqueous solution of silver nitrate in the ratio of 2:1 to 1:4, preferably ca. 1:1, and adding the equivalent amount of sodium carbonate. Following filtration and neutral washing, the powder obtained is dried under vacuum at 35° to 40°C.

Advantageously, the reaction according to the invention is performed in such inert solvents which —according to the method by Meystre and Miescher for the synthesis of steroid glycosides — at the same time, act as water draining agents, continuously remove the water liberated in the transformation by azeotropic distillation. Suitable solvents are e.g. chloroform, benzene, toluene, dichloroethane, trichloroethane, benzene-dioxane, toluene-dichloroethane. Accordingly, transformation is best performed at the boiling temperature of the solvent used.

For performing the reaction, the aglycon is freed from any crystal solvent possibly adhering to it, by means of azeotropic distillation with a suitable solvent, dissolved or suspended in an indifferent solvent and the heavy metal salt/celite reagent is added to the solution or suspension. The reaction mixture is heated to boiling. In order to remove any traces of moisture left, some milliliters of solvent are distilled off before adding the solution of the sugar halide. One may also proceed profitably the following way: the aglycon is dissolved in a suitable solvent and, after addition of celite-agent, is precipitated onto it in a finely-dispersed form, favorable for the reaction, by evaporation under reduced pressure. The residue is then suspended in the reaction solvent and heated to boiling whereupon the sugar halide is added.

Twice to four times an excess of sugar halide and five to ten times an excess of heavy metal salt are used.

The water formed in the reaction is continuously removed by means of azeotropic distillation. In order to maintain the reaction volume at a constant level, fresh solvent is added in accordance with the distillation speed.

Monitoring by thin layer chromatography indicates that transformation is almost completed within 15 to 60 minutes. Following filtration and evaporation of the solvent, the acyl glycoside formed can be isolated by chromatography on aluminum oxide or silica gel. Since this separation process is very tedious owing to the sugar derivatives present in excess, it is expedient to saponify the reaction mixture in toto and to separate the free glycosides from the more polar water-soluble sugars by direct crystallization, extraction with organic solvents or chromatography. Saponification is effected according to previously known methods, by aqueous alcoholic potassium bicarbonate solution or methanolic ammonia.

The products according to the process, being positively inotropic cardiac glycosides, exhibit valuable pharmacological properties and are used for therapy of cardiac insufficiency.

The following examples serve to illustrate the process according to the invention, but they are not intended to limit it thereto:

EXAMPLE 1

Strophantidin-α-L-rhamnoside (Convallatoxin)

7.20 g of silver carbonate on celite (corresponding to 3.46 g of silver carbonate) and 1 g of strophantidin are suspended in 50 ml of dichloroethane and heated to 120°C. Within 15 minutes, a solution of 1.8 g of acetobromorhamnose in 10 ml of dichloroethane is added dropwise under vigorous stirring, at the same time allowing the solvent to distil off. Following addition, the reaction mixture is kept boiling for 15 to 45 minutes. By adding solvent, it is ensured that the reaction volume remains about constant. Thin-layer chromatographic analysis on silica gel (mobile phase: chloroform/methanol 9:1, v/v) shows, that genin is no longer present after this reaction time. Following filtration and evaporation, the residue is dissolved in 50 ml of methanol; to this solution 20 ml of methanolic ammonia solution saturated at 0°C are added. The solution is allowed to stand for 18 hrs. at 5°C, then it is evaporated; by crystallization from methanol/water 733 mg (54% of theory) of pure convallatoxin, m.p. 225°-226° are obtained. Chromatography of the residue from the mother liquor on silica gel yields an additional 274 mg of convallatoxin, the total yield thus increasing to 74%.

The product obtained synthetically proves to be identical with the natural convalltoxin obtained from convallaria drug.

EXAMPLE 2

Digitoxigenin-α-L-rhamnopyranoside (Evomonoside)

374 mg of digitoxigenin and 5.70 g of silver carbonate on celite (corresponding to 2.75 g of silver carbonate) are suspended in 50 ml of absolute benzene and heated to 125°C in an inert gas atmosphere. Under vigorous stirring, a solution of 0.822 g of acetobromorhamnose in 25 ml of benzene is added dropwise within 15 minutes. After the addition has been completed, the reaction mixture is kept boiling for 30 to 45 minutes, then it is allowed to cool; it is filtered and evaporated in vacuo, the residue is taken up in 50 ml of methanol and treated with 25 ml of methanol saturated at 0° with ammonia gas. The solution is allowed to stand for 18 hrs. at room temperature, then it is evaporated in vacuo. The residue is taken up in a small amount of methanol/water and is concentrated under reduced pressure. The crude product (545 mg) which precipitates is separated from the solution, is chromatographed on silica gel and is crystallized from acetone/benzene. M.p. 215°-230°C, yield: 312 mg (60% of theory).

EXAMPLE 3

Strophanthidin-β-D-glucopyranoside 2 g strophanthidin and 11.4 g of silver carbonate on celite (corresponding to 5.5 g of silver carbonate) are suspended in 50 ml of absolute dioxane and 50 ml of benzene and heated to 120°C in an inert gas atmosphere while stirring vigorously. As soon as the solvent starts boiling, a solution of 4.08 g of acetobromoglucose in 25 ml of benzene is added dropwise within 30 minutes. After adding the sugar, the reaction mixture is kept boiling for 30 minutes. It is allowed to cool, then it is filtered and evaporated in vacuo. The residue is taken up in 160 ml of methanol and treated with 40 ml of methanol saturated at 0°C with ammonia gas. The solution is allowed to stand for 18 hrs., then it is evaporated to dryness. Water is aadded to the residue, which is extracted first with chloroform, then with a chloroform/alcohol mixture (2:1, v/v). Chromatography of the chloroform/alcohol extract on silica gel yields 1.704 g of thin-layer chromatographically homogeneous strophantidin-β-D-glucopyranoside (61% of theory), which is recrystallized from isopropanol/ether, m.p. 180°C.

| $C_{29}H_{42}O_{11}$ | Calc.: | C 61.47% | H 7.47% | O 31.06% |
|---|---|---|---|---|
| | Found: | 61.24% | 7.41% | 31.15% |

EXAMPLE 4

Digitoxigenin-β-D-glucopyranoside 374 mg of digitoxigenin and 2.85 g of silver carbonate on celite (corresponding to 1.37 g of silver carbonate) are suspended in 25 ml of absolute benzene and treated with a solution of 710 mg of acetobromoglucose in 7 ml of absolute benzene and while stirring vigorously, heated in an inert gas atmosphere to boiling, the bath temperature being 120°-125°C. Within 60 minutes, distillation is effected while slowly adding dropwise fresh solvent, after cooling to room temperature, the product is filtered and evaporated in vacuo, the residue is taken up in 80 ml of methanol, and, after adding 20 ml of methanol saturated at 0°C with ammonia gas, the solution is allowed to stand over night at room temperature. It is evaporated again, and the residue is taken up in methanol/water. The crude product which precipitates on concentrating in vacuo is chromatographed on silica gel for further purification. 280 mg (52% of theory) of thin-layer chromatographically homogeneous digitoxigenin-β-D-glucopyranoside are obtained as colorless crystalline material. Recrystallizing once from chloroform/methanol yields 237 mg of the product of the melting point 242°-247°C.

What is claimed is:

1. A process for the preparation of glycosides of the general formula I:

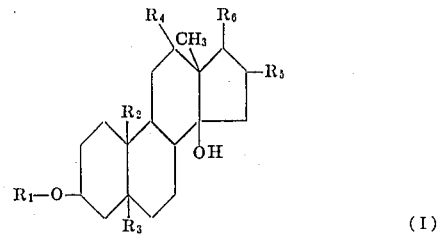

(I)

wherein $R_1$ is a glycosidyl or substituted glycosidyl moiety, $R_2$ is an aldehyde or methyl group, $R_3$, $R_4$, and $R_5$ are each a hydrogen atom or a hydroxyl group, and $R_6$ is a butenolide or an $\alpha$-pyrone-ring, comprising:

A. reacting, in an inert solvent, a steroid aglycone of the general formula II:

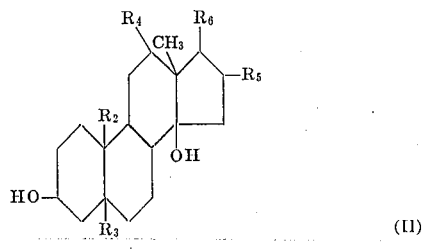

(II)

wherein $R_2$, $R_3$, and $R_6$ have the above meanings, and $R_4$ and $R_5$ are hydrogen atoms, hydroxyl groups, or lower acyloxy groups, with a poly-O-acylglycosidyl halide, wherein the glycosidyl moiety is glucose, rhamnose, mannose, xylose, or allose and the halide moiety is chlorine, bromine, or iodine;

B. removing the water of reaction formed by means of azeotropic distillation, and;

C. saponifying the acylated glycosides thus obtained;
wherein the improvement comprises said reaction of Step A, above, being carried out in the presence of a celite-heavy metal salt precipitate complex wherein the anion of said salt is a carbonate, oxide, or cyanide radical, and the cation of said salt is an element of group I$b$ or II$b$ of the periodic table.

2. The process of claim 1 wherein the celite of the celite heavy metal salt precipitate complex is Kieselgur having a particle size of 20–45 microns and the heavy metal salt precipitate is on said celite.

3. The process of claim 2 wherein said salt is silver carbonate.

4. The process of claim 3 wherein said steroid aglycone is selected from the group consisting of strophantidin and digitoxigenin and said poly-O-acylglycosyl halide is selected from the group consisting of acetobromorhamnose and acetobromoglucose.

* * * * *